US009154283B2

(12) United States Patent
Johansson et al.

(10) Patent No.: US 9,154,283 B2
(45) Date of Patent: Oct. 6, 2015

(54) SELF-ORGANIZING NETWORK CONTROL FOR PUCCH RESOURCES

(75) Inventors: Anders Johansson, Hässelby (SE); Carola Faronius, Järfälla (SE); Leo Hedlund, Älvsjö (SE); Jessica Östergaard, Stockholm (SE); Peter Moberg, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1041 days.

(21) Appl. No.: 13/145,214

(22) PCT Filed: Jan. 21, 2009

(86) PCT No.: PCT/SE2009/050062
§ 371 (c)(1),
(2), (4) Date: Jul. 19, 2011

(87) PCT Pub. No.: WO2010/085187
PCT Pub. Date: Jul. 29, 2010

(65) Prior Publication Data
US 2011/0280206 A1    Nov. 17, 2011

(51) Int. Cl.
*H04L 5/00* (2006.01)
*H04W 72/04* (2009.01)
*H04W 72/12* (2009.01)

(52) U.S. Cl.
CPC ............ *H04L 5/006* (2013.01); *H04L 5/0053* (2013.01); *H04W 72/0486* (2013.01); *H04W 72/1278* (2013.01); *H04W 72/1284* (2013.01); *H04W 72/1289* (2013.01)

(58) Field of Classification Search
None
See application file for complete search history.

(56) References Cited

U.S. PATENT DOCUMENTS

| 2002/0093983 A1* | 7/2002 | Newberg et al. ............... 370/468 |
| 2008/0200203 A1* | 8/2008 | Malladi et al. ................. 455/522 |
| 2008/0247375 A1 | 10/2008 | Muharemovic et al. |
| 2008/0311919 A1 | 12/2008 | Whinnett et al. |
| 2009/0088178 A1* | 4/2009 | Jugl et al. ....................... 455/453 |
| 2009/0124259 A1* | 5/2009 | Attar et al. .................... 455/436 |
| 2009/0290549 A1* | 11/2009 | Tiirola et al. ................. 370/329 |

FOREIGN PATENT DOCUMENTS

WO    WO 2009/093944    7/2009

OTHER PUBLICATIONS

Author Unknown, R1-074737, submission to 3GPP TSG RAN WG1 Meeting 51, LG ELectronics, pp. 1-4, Nov. 9, 2007.*

(Continued)

*Primary Examiner* — Christopher Crutchfield
(74) *Attorney, Agent, or Firm* — Baker Botts, LLP

(57) ABSTRACT

Automatically adjust the size of a Physical Uplink Control Channel, PUCCH, of an uplink communication subframe. In a particular embodiment, the size of a semi-static region of the PUCCH is adjusted. The adjustment is based on a utilization factor of the PUCCH over a time period. The adjustment can also be based on the connection factor (connections between the wireless terminals and the cell) and/or based on the utilization factor of a PUSCH (Physical Uplink Shared Channel). The result is an efficient resource utilization on the PUCCH, and a properly dimensioned PUCCH region.

21 Claims, 12 Drawing Sheets

(56) References Cited

OTHER PUBLICATIONS

Author Unknown, Variable configuration sizes of PUCCH and its impact on UL ACK/NACK mapping relations, Document No. R1-074737, Submission to 3GPP TSG RAM Working Group 1 Meeting 51, Nov. 9, 2007, pp. 1-4.*

International Search Report for PCT/SE2009/050062, mailed Nov. 4, 2009.

Panasonic: "Synchronization of L1 parameter from system information (Reply to: R2-082898)", 3GPP Draft, R1-082415, $3^{rd}$ Generation Partnership Project, vol. RAN WG1, no. Warsaw, Poland, Jun. 2008 (whole document).

3GPP: $3^{rd}$ Generation Partnership Project, Technical Specification Group Radio Access Network, Evolved Universal Terrestrial Radio Access (E-UTRA); Physical layer procedures, paragraphs 7.2 and 8.

\* cited by examiner

SELF-ORGANIZING NETWORK CONTROL FOR PUCCH RESOURCES

This application is the U.S. national phase of International Application No. PCT/SE2009/050062 filed 21 Jan. 2009 which designated the U.S., the entire content of which is hereby incorporated by reference.

TECHNICAL FIELD

The disclosed technology relates to controlling load on the physical uplink control channel of an uplink communication subframe through the use of self-organizing network algorithms.

BACKGROUND

Long Term Evolution, also referred to as "LTE", is a radio access technology being standardized by the 3$^{rd}$ Generation Partnership Project, hereinafter referred to as "3GPP". In LTE, all services are supported through a packet switched domain. Downlink and uplink transmission in LTE use multiple access technologies—orthogonal frequency division multiple access, referred to as "OFDMA", for the downlink, and single-carrier frequency division multiple access, referred to as "SC-FDMA" for the uplink.

FIG. 1 graphically represents an example subframe of an OFDMA/SC-FDMA radio signaling. In both OFDMA and SC-FDMA, a large number of closely spaced orthogonal subcarriers are transmitted in parallel. Thus, the signaling is defined by both frequency and time components.

In LTE, radio communication between a user equipment, hereinafter referred to as "UE" and an eNodeB is performed through defined radio frames. Each frame is 10 ms long and is divided into 10 subframes, each 1 ms long. Each subframe is further subdivided into two slots each with 0.5 ms duration. Thus, a transmitted signal in each slot or subframe is defined by a resource grid of a number of subcarriers in the frequency domain and a number of symbols in the time domain.

In FIG. 1, one downlink/uplink subframe, i.e., two slots, of LTE's radio resource is illustrated. The subframe is allocated in units of one or more physical resource blocks, hereinafter referred to as "PRB". That is, the PRB is the smallest unit of radio resource assigned by the eNodeB for any UE. Depending on the configuration, each PRB spans a number of subcarriers in the frequency domain and spans a number of symbols, either OFDM or SC-FDMA, in the time domain. One symbol on one subcarrier is a resource element or simply "RE".

In each PRB, there are 12 consecutive subcarriers in the frequency domain. With a normal spacing of 15 kHz between adjacent subcarriers, the frequency bandwidth of each PRB is 180 kHz. The PRB also spans 7 symbols in the time domain, i.e., the PRB spans one slot or 0.5 ms.

No dedicated channels are used in LTE to transport user data. Instead shared transport channel resources are used in both the downlink and the uplink. For the uplink, the uplink shared channel is controlled by a scheduler on the eNodeB that assigns different parts of the shared channel to different UEs for transmission of user data to the eNodeB. The uplink shared channel is mapped to the physical uplink shared channel, hereinafter referred to as "PUSCH", on the downlink SC-FDMA subframe. The PUSCH is used primarily for data transport, and therefore, is designed to achieve high data rates.

The SC-FDMA subframe also includes the physical uplink control channel, hereinafter referred to as "PUCCH". The PUCCH is used to carry uplink control information, or simply "UCI", from the UEs to the eNodeB as will be explained further below.

FIG. 2 illustrates a simplified view of the SC-FDMA subframe. The view is simplified in that only the PUSCH and PUCCH resources are illustrated. It is recognized that in addition to the PUSCH and the PUCCH, the SC-FDMA subframe can also carry the physical random access channel, referred to as "PRACH" and the reference signal. But in general, the amount of the SC-FDMA subframe resources allocated to the PRACH and the reference signal is minor in relation to the PUSCH and the PUCCH. FIG. 2 reflects the observation that the SC-FDMA subframe is predominantly shared between the PUSCH and the PUCCH.

The PUSCH resource occupies the middle subcarriers of the SC-FDMA frequency spectrum. On the spectrum band edges, a control region is located on which the PUCCHs are transmitted. As mentioned above, the PUCCHs are allocated to allow the UEs to transfer the UCIs to the eNodeB. The UCI includes channel quality indication reports, scheduling requests, and ACK/NACK responses from UEs to previously scheduled downlink user data transmission from the eNodeB. The channel quality indication and the scheduling requests may also be referred to as "CQI" and "SR", respectively.

To enable efficient resource utilization of the PUCCH, the SR, CQI, and ACK/NACK responses of several UEs are multiplexed on the PUCCH through code division multiplexing, also referred to as "CDM". This allows several UEs to share one PRB of the PUCCH.

As noted previously and illustrated in FIG. 2, the uplink SC-FDMA subframe is primarily shared between the PUCCH and the PDCCH. That is, when a greater portion of the SC-FDMA subframe is allocated to the PUCCH, less is available for the PUSCH and vice versa.

Since the PUSCH carry user data, then to increase user data throughput, the PUSCH allocation should be maximized. This can be accomplished by an aggressive allocation of the PUCCH, e.g., assigning many CDM codes so that many UEs can simultaneously transmit the CQI reports, SRs, and ACK/NACK responses, etc., on the same time-frequency resource, i.e., share the same PRB of the PUCCH to minimize the PUCCH and correspondingly increase the PUSCH. However, many UEs simultaneously using the same PRB carries a risk of unacceptable error probability due to interferences. This in turn would decrease the system and/or user throughput and degrade overall system performance.

On the other hand, an unnecessarily cautious allocation—either through increasing the amount of resources allocated to the PUCCH or reducing the amount of signaling sent on the PUCCH—also carries risks. Increase in the of PUCCH allocation correspondingly reduces the uplink resources available for the PUSCH, which can lead to reduced data throughput. A reduction in the signaling amount can lead to a performance degradation due to delay caused by sparser SR opportunities, less accurate channel information due to sparser CQI reports, and restrictions on the scheduler due to less flexibility in the number of ACK/NACK responses.

SUMMARY

Non-limiting examples of methods and apparatuses are described that automatically adjust the size of PUCCH including methods and apparatuses that automatically adjust the size of the semi-static region of the PUCCH. According to an aspect, the adjustment is performed based on a utilization of the PUCCH over a time period. The adjustment can also be performed based on the connections between the wireless terminals, e.g., UEs, and the cell and/or based on the utilization of the PUSCH. The result is an efficient resource utilization on the PUCCH, and a properly dimensioned PUCCH region.

According to an aspect, methods and apparatuses autonomously adapt the PUCCH region to changes in the network over a long-term scale such as hourly, daily, weekly, etc. Operation on long-term time scale puts these methods in the category of self-organizing network algorithms, hereinafter referred to as "SON" algorithms.

According to an aspect, a method is performed by a scheduler to schedule the PUCCH resource of a cell in a wireless network for one or more wireless terminals. The scheduler, which can be a part of a base station, determines a PUCCH utilization factor for a semi-static UCI component of a semi-static region of the PUCCH over a time period. The time period can be one of many specified time periods, and at least one specified time period repeats in a pattern. The PUCCH utilization factor for a UCI component is a measure of an amount of PUCCH resources allocated for the UCI component relative to the amount of PUCCH resources available during the time period.

According to an aspect, scheduler adjusts—increases or decreases—the semi-static PUCCH region based on the PUCCH utilization factor. The scheduler increases the semi-static PUCCH region if the PUCCH utilization factor is above an upper bound of a PUCCH target range, and decreases the semi-static PUCCH region if the PUCCH utilization factor is below a lower bound of the PUCCH target range.

According to an aspect, the scheduler determines a connection factor and adjust the semi-static PUCCH based on the determined connection factor. The connection factor is a measure of quantity of simultaneous connections experienced between the cell and the wireless terminals over the time period.

According to an aspect, the scheduler determines a PUSCH utilization factor and adjusts the semi-static PUCCH based on the determined PUSCH utilization factor. The PUSCH utilization factor is a measure of utilization of the PUSCH available for data transport over the time period.

According to an aspect, the scheduler applies the adjusted semi-static PUCCH region to a future time period. According to an aspect, the scheduler updates an operation profile of the cell with the adjustment information so that in the future time period, configuration of the PUCCH region can be initially set.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
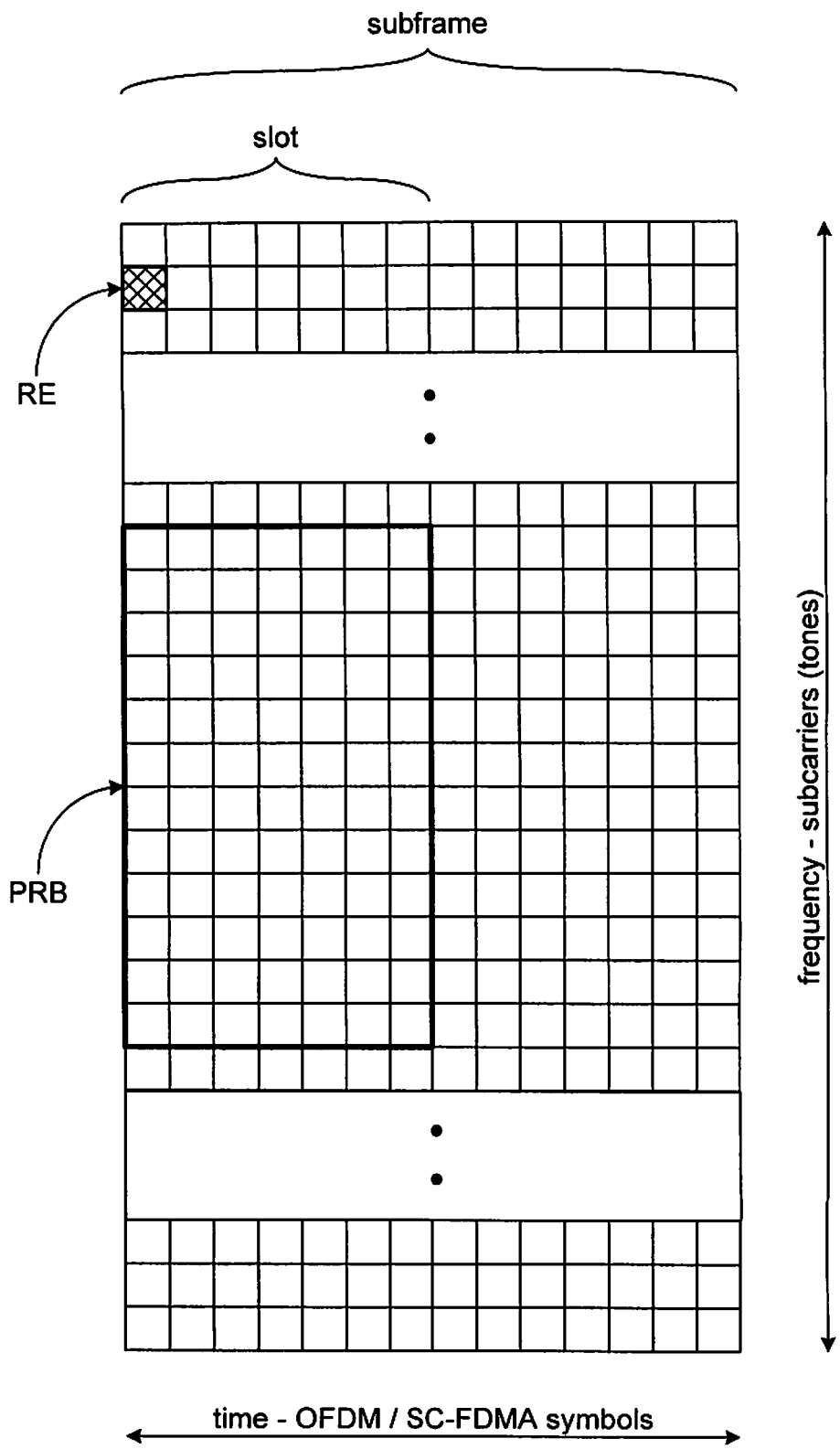
FIG. 1 illustrates an example 3GPP radio communication subframe.
Figure 2:
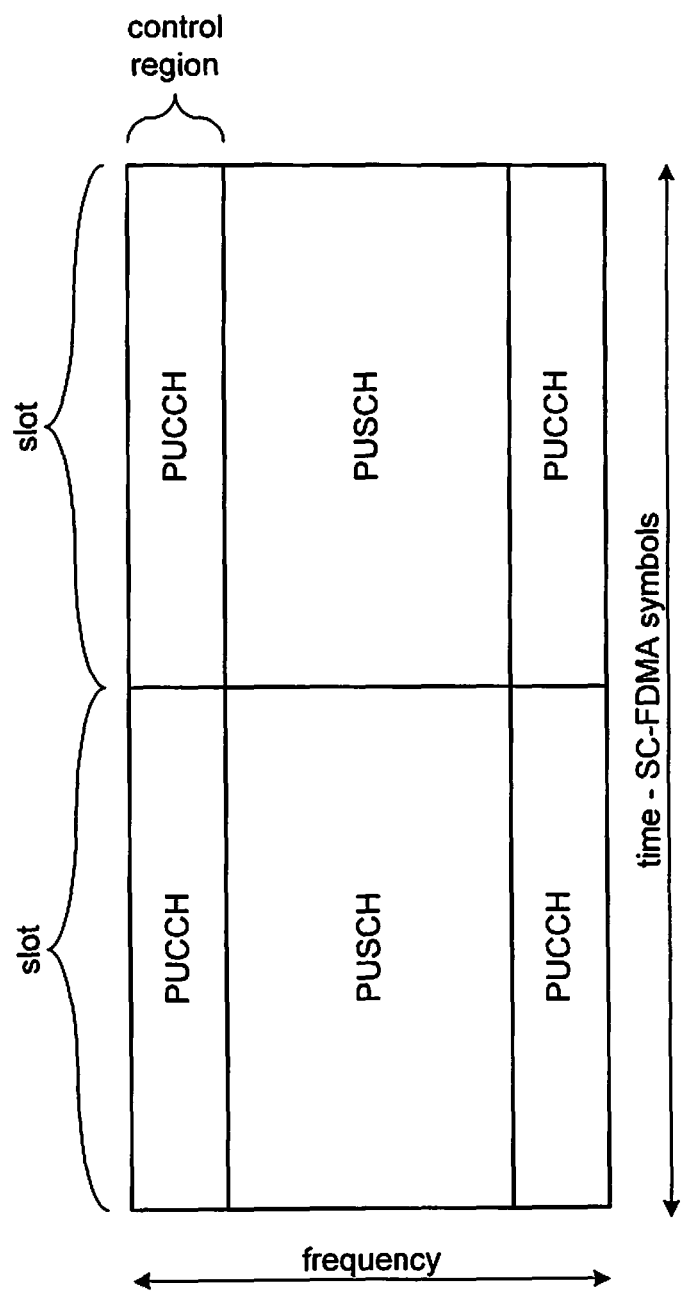
FIG. 2 illustrates a simplified SC-FDMA subframe allocated between PUCCH and PUSCH.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor hardware, read only memory for storing software, random access memory, and non-volatile storage.

In the description below, 3GPP network, and particular, the LTE is used for explanation. However, the scope is not so limited. The concepts described herein are applicable to other type of wireless network. Thus, while the term PUCCH is used, the term can also refer to any physical channel capable of transferring control signals in an uplink direction from the wireless terminals to a base station of a wireless network. Similarly, the PUSCH can refer to any physical channel that is shared amongst the wireless terminals and capable of transferring user data in the uplink direction from the wireless terminals to the base station.

In allocating the uplink subframe, e.g., the SC-FDMA subframe of the 3GPP LTE, between the PUCCH and the PUSCH, there are risks associated with both aggressive and cautious approaches to set the size of the PUCCH. Thus, it is important to find a good trade-off between a quality criterion on the PUCCH and the size of the PUCCH on the uplink subframe.

However, finding a balanced trade-off between PUSCH and PUCCH sizes is difficult. Current state-of-the-art is to find a static trade-off, or to manually retune the parameters regulating the PUCCH quality and size. But as the network load changes over time, a PUCCH allocation that is adequate during one time period or an instant can quickly become overly cautious or overly aggressive. Since the trade-off can vary over time, the static allocation is not preferable to ensure that the system has an adequately sized PUCCH to secure control signalling reliability and to maximize the PUSCH resource, and thus to maximize the UL throughput.

In addition to time, the trade-offs are very likely to vary between the cells. Hence, one or more embodiments and/or methods of the disclosed technology implement adaptive tuning algorithms to tune the resources set aside for the PUCCH. According to one aspect, the adaptive tuning algorithms avoids the manual tuning of the cells and automatically follows the changes of the cells over time. The adaptive tuning can be set to be relatively aggressive or relatively cautious. For a cell in a noisy environment, the relatively cautious approach may be preferred. Conversely, for a relatively noise-free environment, the aggressive approach may be acceptable.

The PUCCH includes a dynamically configured region and a semi-statically configured region. In the dynamically configured PUCCH region, the allocated resources are valid only for a specific time period such as one slot or subframe. For the most part, the ACK/NACK resources for the wireless terminals, e.g., user equipments, are scheduled dynamically so that each recipient wireless terminal may provide responses to downlink data directed to the wireless terminal carried on a physical downlink shared channel, hereinafter referred to as "PDSCH", on a previously received OFDM subframe.

In contrast, the semi-statically scheduled resources are valid for the wireless terminal in the cell until the wireless terminal loses synchronization, ends the service session, performs a handover, or if the resource is otherwise revoked. For example, the PUCCH resources allocated to carry the channel status reports, e.g., CQI reports, and scheduling requests are semi-static. There are also ACK/NACKs that can be semi-statically allocated.

According to one aspect, an example adaptive tuning algorithm is implemented on a scheduler of a cell of a wireless network. Note that scheduler is normally associated with, e.g., is a part of, a base station and that a "cell" is not necessarily equivalent to a "base station". However, the cell and the base station are related in that the cell refers to a radio coverage area provided by the base station. Thus, a scheduler of a cell can refer to a scheduler of a base station providing the coverage corresponding to the cell.

Figure 3:
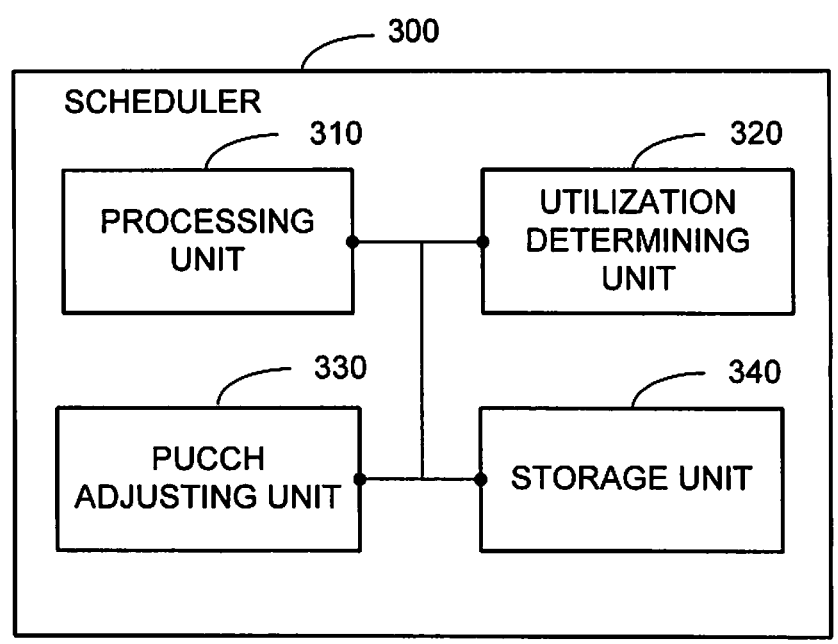
FIG. 3 illustrates an example embodiment of a scheduler of a base station.

FIG. 3 illustrates an embodiment of a scheduler 300 of a base station corresponding to the cell. The scheduler 300 includes a processing unit 310, a utilization determining unit 320, a PUCCH adjusting unit 330, and a storage unit 340. In this embodiment, the processing unit 310 is arranged to coordinate and control the operations of the other units of the scheduler 300 to provide scheduling services to the wireless terminals. The details of the operations provided by the various units of the scheduler 300 will be provided below in the context of describing the details of an example adaptive tuning algorithm.

But initially, the example adaptive tuning algorithm is generally described so that a context to understand the details can be provided. In general, the algorithm evaluates a performance of the cell or the wireless system in general. Then based on the evaluation, the algorithm decides whether to decrease the PUCCH region, increase the PUCCH region, or leave the PUCCH region unchanged.

For clarification, the PUCCH region or size in this context refers to the semi-statically allocated PUCCH region unless specifically stated otherwise. Also, the UCI components refer to the semi-static UCI components including the semi-static ACK/NACK component unless stated other wise.

In the PUCCH region, the uplink PRB resources are allocated to carry, from the wireless terminals, the CQI, SR, and the ACK/NACK responses related to semi-persistently scheduled downlink data. The wireless terminals can also report precoding matrix indicators and rank indications on the PRBs of the semi-static PUCCH region. The precoding matrix indicator and the rank indication can also be referred to as "PMI" and "RI", respectively.

The example adaptive tuning algorithm operates over a long time scale such as hourly, daily, weekly, and so on. For semi-static PUCCH allocations, being able to react instantaneously to fast changing conditions is not critical. Thus, the algorithm need not be responsive on a short time scale. The example adaptive tuning algorithm is thus categorized as a type of a SON algorithm since it adapts, perhaps gradually to changes over the long time scale. Historical performances over the long time scale can be considered in the algorithm when tuning the PUCCH region.

Generally, the automatic setting of the PUCCH region is based on the load and the capacity of the PUCCH region. The setting can also be based on, among others, the load on the PUSCH and on the connections between the cell and the wireless terminals. The algorithm can autonomously adapt the PUCCH region to changes in the network load. The result is an efficient resource utilization of the PUCCH, and a properly dimensioned PUCCH region.

The example algorithm facilitates an automatic setting of the size of the PUCCH region based on evaluations of the UCI components. In one specific application of the SON algorithm, the utilization of the PUCCH resources corresponding to the CQI component is averaged over time and compared to a set of thresholds. Based on the comparison, a decision is made regarding whether the size of the PUCCH should be increased, decreased, or kept unchanged.

Figure 4:
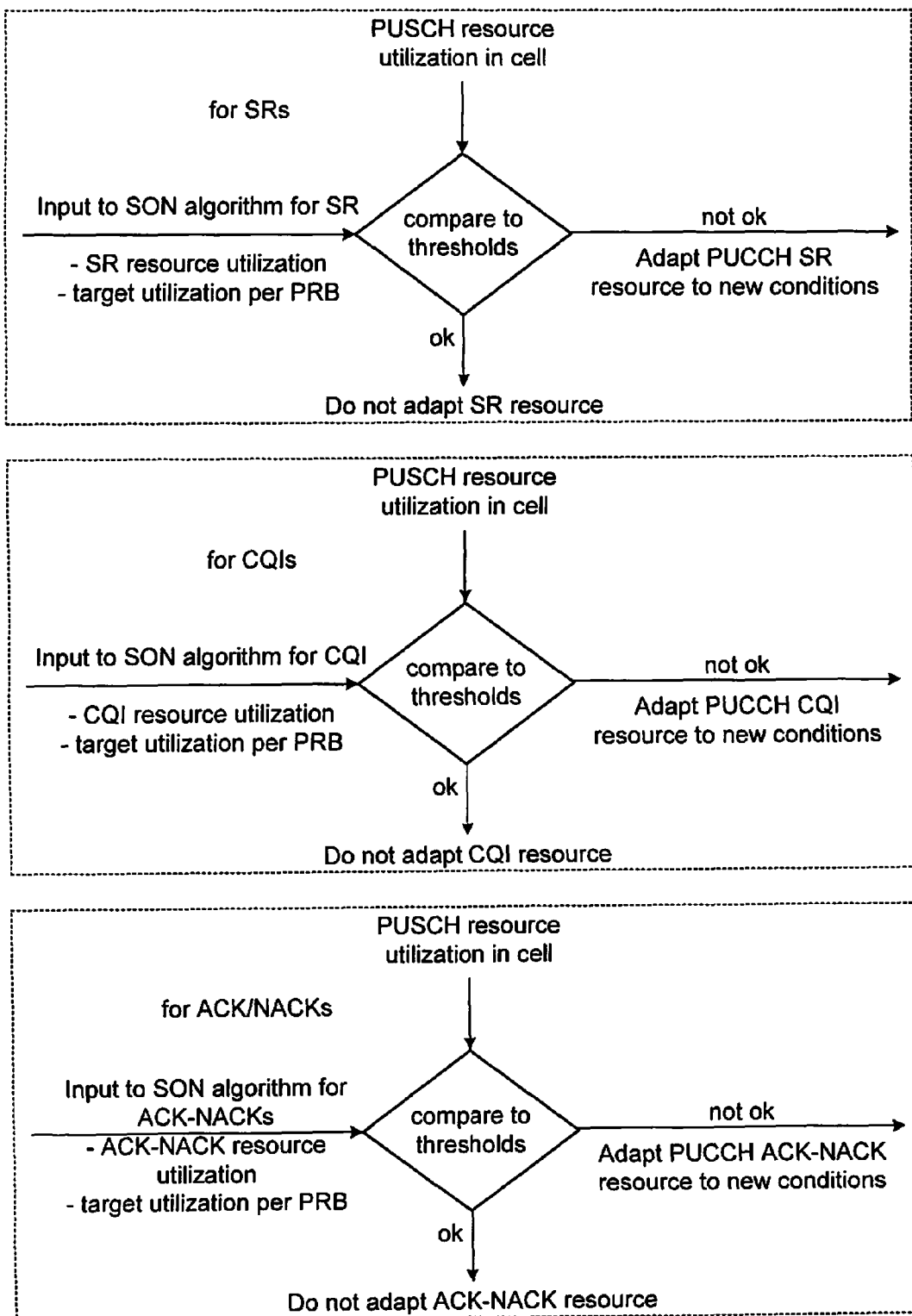
FIG. 4 illustrates example representations of SON algorithms to control the PUCCH resource of an uplink subframe.

FIG. 4 illustrates a functional block view of the example SON algorithm, which evaluates the utilization of the PUCCH resources for the UCI components SR, CQI, and ACK/NACKs and decides whether or not to adjust the PUCCH region based on the evaluation.

While FIG. 4 specifically illustrates the algorithm for the SR, CQI, and ACK/NACK components, the evaluation are not limited to these components. Utilization may be evaluated for any of the UCI components. Further, utilization for any combination of the semi-static UCI components may also be evaluated, for example, by combining the individual utilizations. Also, the evaluation processes need not be the same for all UCI components. That is, the evaluation process for the SR, CQI, ACK/NACK, PMI, and RI resource allocations can be different from each other.

Figure 5:
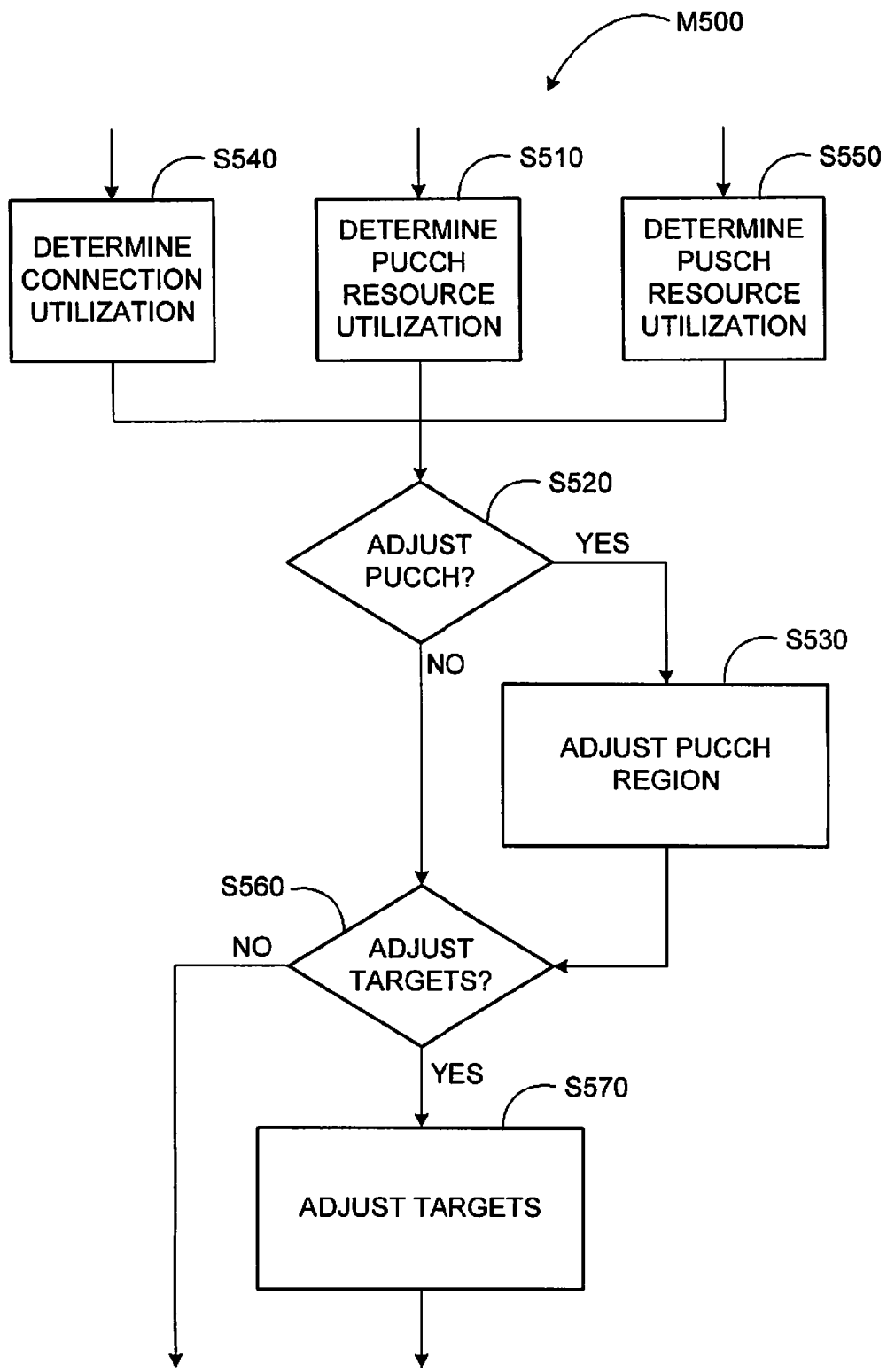
FIG. 5 illustrates an example method to schedule the PUCCH resource.

FIG. 5 illustrates an example method M500 to implement an adaptive algorithm. According to a variant, the method M500 is performed by a scheduler 300 to schedule the PUCCH resource of a cell to one or more wireless terminals in a wireless network. The wireless network can be, e.g., a 3GPP network such as the LTE. The scheduler 300 can be a part of an eNodeB providing coverage corresponding to the cell.

To implement the method, the utilization determining unit 320 determines a PUCCH resource utilization for over a time period in step S510. Note that the utilization determining unit 320 can also determine a connection utilization in step S540 and/or determine a PUSCH resource utilization in step S550 over the time period. Each of the steps S510, S540, and S550 are examples of determining utilization of shared uplink resources.

In step S520, the PUCCH adjusting unit 330 determines whether or not to adjust the PUCCH region based on the shared uplink resource utilization by the utilization determining unit 320. If it so determines, then in step S530, the PUCCH adjusting unit 330 makes the appropriate adjustment. For example, when the PUCCH utilization is determined, the PUCCH adjusting unit 330 adjusts the PUCCH region when it determines that the adjustment is needed based on the PUCCH utilization. The PUCCH adjusting unit 330 can perform similar determinations and take appropriate adjustment actions in steps S520 and S530 taking into account the connection utilization and/or the PUSCH resource utilization when one or both are determined.

The time period can be of a long time scale such as an hour, four hours, days, weeks, and so on. Also, the time period can be one of one or more specified time periods. One specified time period may be "7:00 AM-9:00 AM" and another may be "4:00 PM-6:00 PM".

Further, some or all specified time periods may repeat in a pattern. For example, "weekday morning rush" may be defined as "7:00 AM-9:00 AM, Monday-Friday". In a very simple example, one time period can be defined as "one hour starting at the top of the hour" that continually repeats.

The processing unit 310 applies the adjustment to the PUCCH region to a future time period. For example, an adjustment based on the evaluation made during the "7:00 AM-9:00 AM" on a Monday may be applied to the same time period on a Tuesday since it is likely the cell will be used similarly (e.g., both are part of the "weekday morning rush" period). In the very simple example of the one time period that repeats, the processing unit 310 adjustment based on a previous hour may be applied to a next hour.

Also, some "smoothing" can be applied to the adjustment—either by the processing unit 310 or by the PUCCH adjusting unit 330—to lessen the effect of an occurrence of an aberrant event. For example, a road may be closed unexpectedly for repairs. Then the utilization of a cell near the closed road would be unexpectedly low even during "weekday morning rush" time period. Applying the adjustment made based solely on one evaluation of the time period to the next day's "weekday morning rush" time period may be inappropriate when the road opens. So when adjusting the PUCCH region, a form of smoothing such as a sliding average—e.g., average based on past five observations of the "weekday morning rush" time periods—may be applied.

To enable adjustments to be applied to the future time periods, an operation profile for the cell may be maintained, e.g., in the storage unit 340. In the operation profile, one or more specific time periods can be defined and the configuration information for the PUCCH region specified for each specific time period. At the beginning of a particular time period, the processing unit 310 can initially set the configuration of the semi-static PUCCH region based on the operation profile. When the PUCCH adjustment is deemed necessary after evaluation over the particular time period, the PUCCH adjusting unit 330 can update the operation profile with information related to the adjustment to the adjusted semi-static PUCCH region for the particular time period. Then at the next instance of the particular time period, the PUCCH region can be initially configured with the adjustment.

As noted, the decision to adjust the PUCCH region can be made based on the PUCCH utilization. In an aspect, PUCCH utilization factor of one or more UCI components is determined. The PUCCH utilization factor for a particular UCI component can be viewed as a measure of what portion of the available PUCCH resources are allocated to carry the particular UCI component during the specified period. As an example, the PUCCH utilization factor for the CQI component would reflect the amount of the PUCCH resources allocated to carry the CQI reports relative to the amount of the PUCCH resources available during the time period.

Figure 6A:
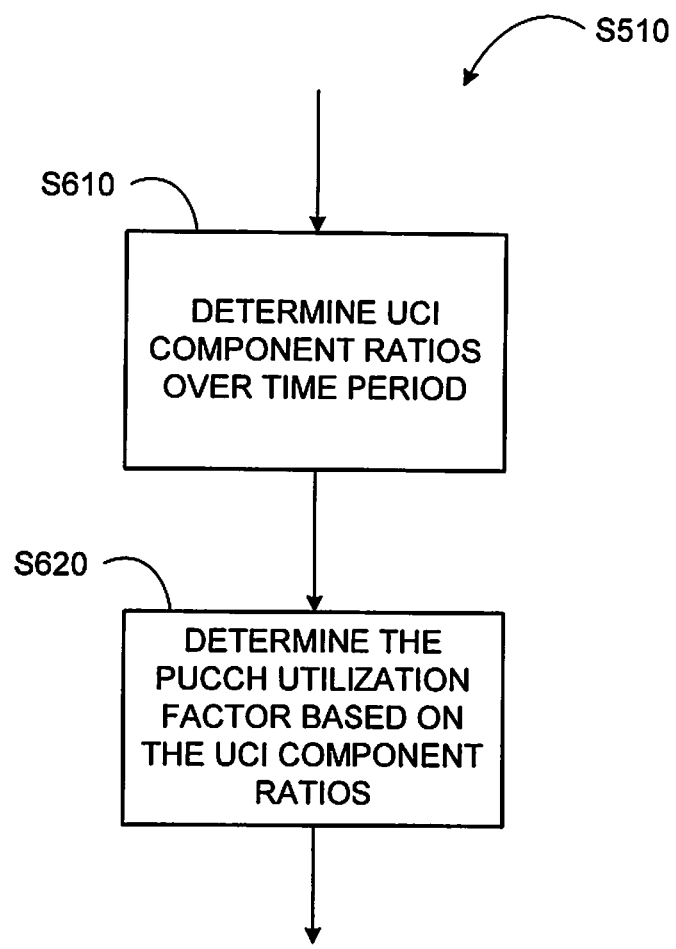
FIGS. 6A, 6B, and 6C illustrate example methods to determine the PUCCH utilization factor, the connection factor, and the PUSCH utilization factor, respectively.

FIG. 6A illustrates an example process the utilization determining unit 320 performs to implement the step S510 of determining the PUCCH utilization factor for a UCI component. In step S610, the utilization determining unit 320 determines a UCI component ratio of the UCI component for each of a plurality of uplink subframes over the time period. For any individual uplink subframe, the UCI component ratio can be defined as a ratio of an amount of semi-static PUCCH resources allocated for the UCI component relative to an entire amount of the semi-static PUCCH resources available in the uplink subframe.

The utilization determining unit 320 then determines the PUCCH utilization factor based on the distribution of the UCI component ratios over the time period. For example, average, sliding average, median, mode, etc. of the distribution of the UCI component ratios can be determined to be the PUCCH utilization factor for the UCI component. Preferably, the time period is of a duration such that sufficient number of data points, e.g., UCI component ratios, can be collected to make the PUCCH utilization factor meaningful. That is, there should a level of confidence that the PUCCH utilization factor is an accurate representation of a general behavior of the cell during the time period.

To reduce the computational load, the UCI component ratios need not be determined for all uplink subframes during the time period. That is, the determination can be made for a subset of the subframes. When the time period's duration is long such as an hour, the number of subframes is rather large. In LTE, there are 3.6 million SD-FDMA subframes in one hour. Even if the UCI component ratio is determined for every 1000 subframes, 3,600 UCI component ratios can be determined. This may be sufficient to make the PUCCH utilization factor meaningful. The selection of the subset of the uplink subframes can be modified as needed or desired.

The example process illustrated in FIG. 6A determines the PUCCH utilization factor for one UCI component such as the CQI. However, it should be noted that the utilization determining unit 320 can repeat the process to determine the PUCCH utilization factor for other UCI components including the SR, ACK/NACK, PMI, RI, and so on. The PUCCH utilization factors for more some or all, i.e., more than one, UCI components can be determined within the same time period. In one variant of the step S610, the utilization determining unit 320 can determine the individual UCI component ratios multiple UCI components for each of the subset of subframes.

In another variant of the step S610, the subset of subframes are chosen so that within each chosen subframe, the UCI component ratios are determined for a predetermined component number, which has an advantage of distributing the computational load. In a special case, the predetermined component number can be set to one. In this instance, the utilization determining unit 320 determines the UCI component ratio for a single UCI component within one subframe. In subsequent subframes, the UCI component ratio for other components can be determined.

For example, in subframes sf(n), sf(n+1), sf(n+2), and sf(n+3) of the time period, the component ratios for the CQI, SR, ACK/NACK, and PMI may be respectively determined. This process can be repeated to obtain the distribution of the ratios for some or all UCI components during the time period. Also, it is not necessary that successive subframes be used. That is, the subframes sf(n+1), sf(n+2), sf(n+3), etc. can be generalized as sf(n+a), sf(n+b), sf(n+c), etc. where "a", "b", "c", etc. are not necessarily consecutive.

Figure 7A:
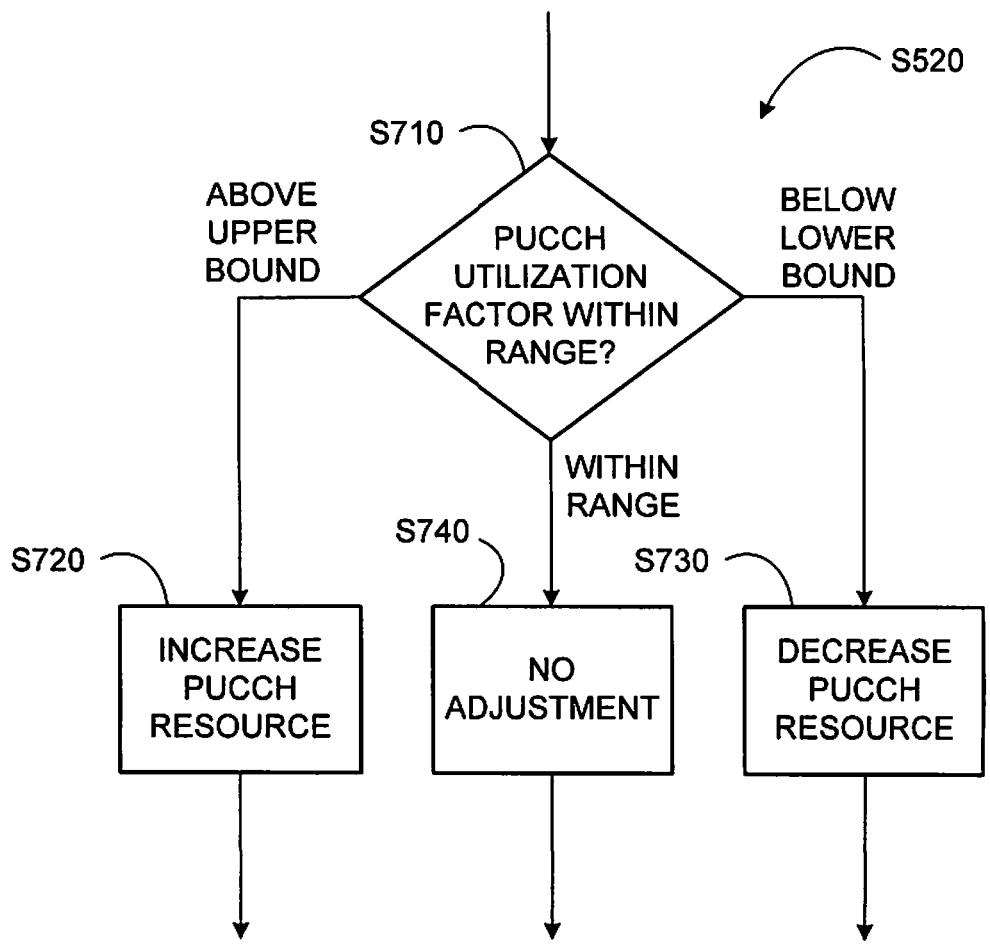
FIGS. 7A, 7B, and 7C illustrate example methods to adjust the PUCCH utilization factor, the connection factor, and the PUSCH utilization factor, respectively.

After the PUCCH utilization factor for the UCI component is determined, the PUCCH adjusting unit 330 determines whether or not the PUCCH region should be adjusted in step S520. FIG. 7A illustrates an example process the PUCCH adjusting unit 330 performs to carry out the step S520. As shown, the PUCCH adjusting unit 330 compares the PUCCH utilization factor to a target PUCCH range for the UCI component in step S710. The PUCCH adjusting unit 330 determines that the PUCCH region should be increased when the PUCCH utilization factor is above an upper bound of the target PUCCH range in step S720. Conversely, the PUCCH adjusting unit 330 determines that the PUCCH region should be decreased when the PUCCH utilization factor is below a lower bound of the target PUCCH range in step S730. The PUCCH adjusting unit 330 determines that no adjustment is necessary when the PUCCH utilization factor is within the target range for the component in step S740.

The target PUCCH range need not be the same for all UCI components. As an example, the target PUCCH range for the CQI and the SR need not be the same. Also, each UCI component can have a corresponding target PUCCH range that is valid for the time period. As an example, the target PUCCH range of the CQI can differ from one time period to another.

In an embodiment, the information regarding the target PUCCH ranges for each of the UCI components for each of the time period can be recorded in the operation profile. When a particular time period is entered, the appropriate target PUCCH ranges can be provided to the PUCCH adjusting unit 330 to so that proper evaluation may be carried out during the particular time period.

Note that the steps S510, S520, and S530 may be performed for more than one UCI component during the time period. Similarly, steps S540 and S550, which is described in further detail below, can also be performed during the same time period.

Referring back to FIG. 5 and as noted before, the decision to adjust the PUCCH region can also be made based the connection utilization determined in step S540. One example of the connection utilization is a connection factor of a cell, which can be viewed as a measure of a number of simultaneous connections experienced between the cell and the wireless terminals.

Figure 6B:
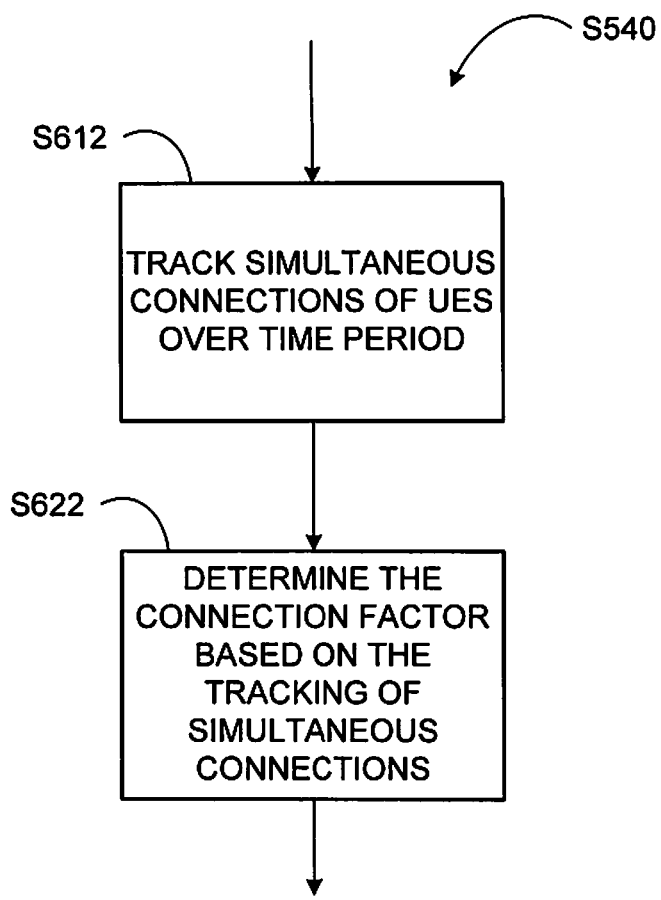

FIG. 6B illustrates an example process performed by the utilization determining unit 320 to determine the connection factor of the cell during the time period. As illustrated, the utilization determining unit 320 tracks the simultaneous connections between the cell and the wireless terminals in the uplink subframes over the time period in step S612. For example, the utilization determining unit 320 determines a number of simultaneous connections existing between the cell and the wireless terminals for each of a plurality of uplink subframes over the time period.

Then in step S622, the utilization determining unit 320 determines the connection factor based on the simultaneous connections tracking. Similar to the operation performed to determine the PUSCH utilization factor, the connection factor can be determined based on the distribution of the tracked simultaneous connections. To reduce the computational load, the number of simultaneous connections can be tracked for a subset of the uplink subframes. Preferably, the number of subframes is enough so that the connection factor is meaningful. It should be noted that the individual subframes used for tracking the simultaneous connections in step S612 need not be the same subframes used to determine the UCI component ratios in step S610.

Figure 7B:
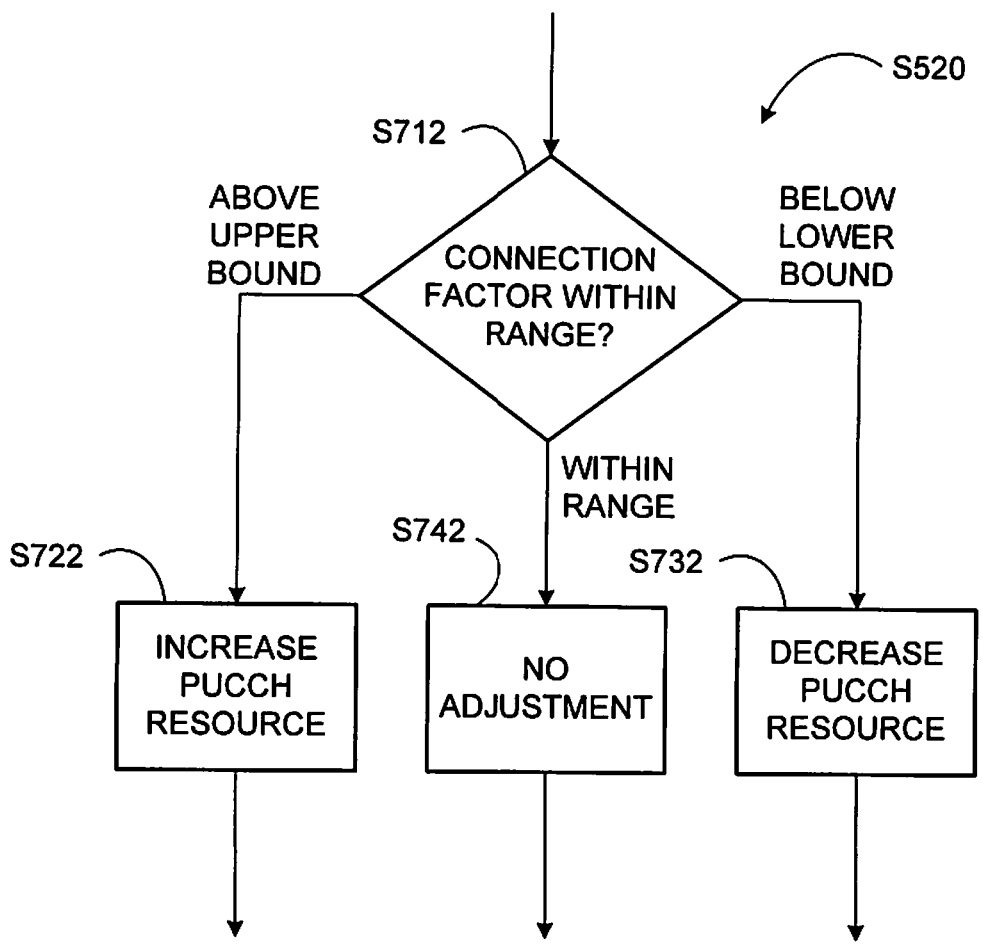

When the connection factor is determined, then as illustrated in FIG. 7B, the PUCCH adjusting unit 330 determines whether or not the PUCCH region should be adjusted (step S520) based on the determined connection factor. That is, the PUCCH adjusting unit 330 compares the connection factor to a target connection range (step S712). The PUCCH adjusting unit 330 determines that the PUCCH region should be increased when the connection factor is above an upper bound of the target connection range (step S722) and determines that the PUCCH region should be decreased when the connection factor is below a lower bound of the target connection range (step S732). No adjustment is necessary when the connection factor is within the target range (step S742).

The logic behind incorporating the connection factor, and for incorporating the connection utilization in general, is that the PUCCH requirement generally increases with the number of simultaneous users so that most or all wireless terminals would have some PUCCH allocations. For small number of simultaneous connections, it may be justified to decrease the PUCCH region, which in turn increases the PUSCH region for increased throughput. For example, if the number of simultaneous connections falls below 10 for more during the time period, then the PUCCH region could be reduced by one PRB per band edge. If the number remains above 20 over the time period, then the PUCCH region could be increased by two PRBs per band edge. While this is not a perfect measure since the generated PUCCH load varies between users, it still provides a level of adaptability that would not be present otherwise.

Again referring back to FIG. 5, the decision to adjust the PUCCH region can further be made based on the PUSCH utilization determined in step S550. One example of the PUSCH utilization is a PUSCH utilization factor of a cell, which can be viewed as a measure of utilization of the PUSCH used to transfer the user data in relation to the amount of the shared channel resources available. In step S550, the PUSCH utilization factor of the PUSCH used by the wireless terminals to transfer user data to the cell can be determined.

Figure 6C:
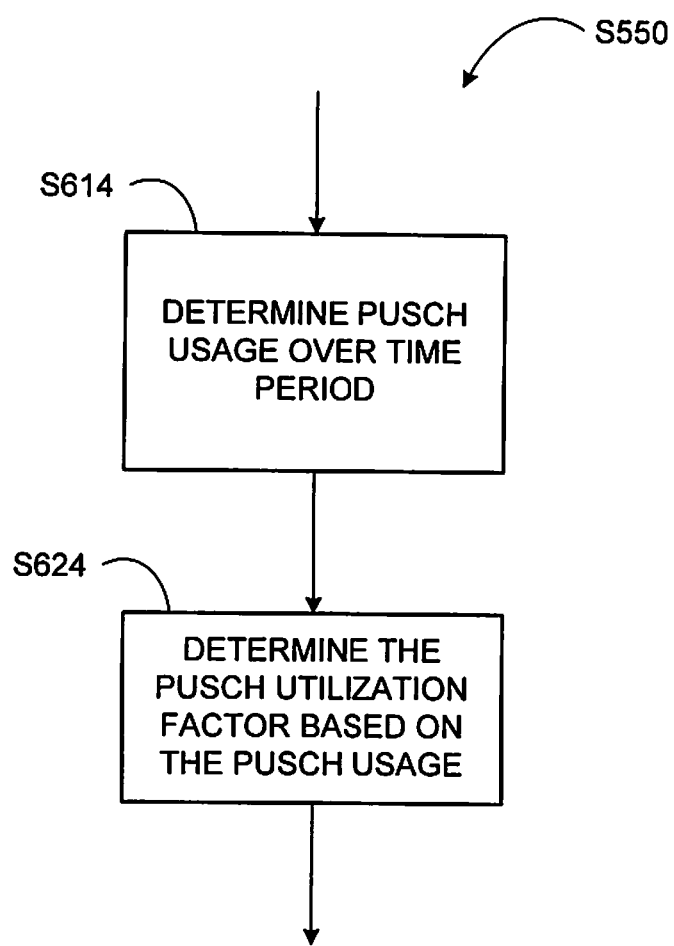

FIG. 6C illustrates an example process performed by the utilization determining unit 320 to determine the PUSCH utilization factor over the time period. As illustrated, the utilization determining unit 320 determines a PUSCH usage in general including a ratio of the PUSCH resources used relative to the amount of the PUSCH resources available for each of a plurality of uplink subframes over the time period in step S614. To reduce the computational load, the plurality of subframes can be a subset of the uplink subframes in the time period. In step S624, the utilization determining unit 320 determines the PUSCH utilization factor based on a distribution of the ratios. Preferably, the number of subframes is enough so that the PUSCH utilization factor is meaningful. It should be noted that the individual subframes used to determined the PUSCH usage in step S614 need not be the same subframes used either to track the simultaneous connections in step S612 or to determine the UCI component ratios in step S610.

Figure 7C:
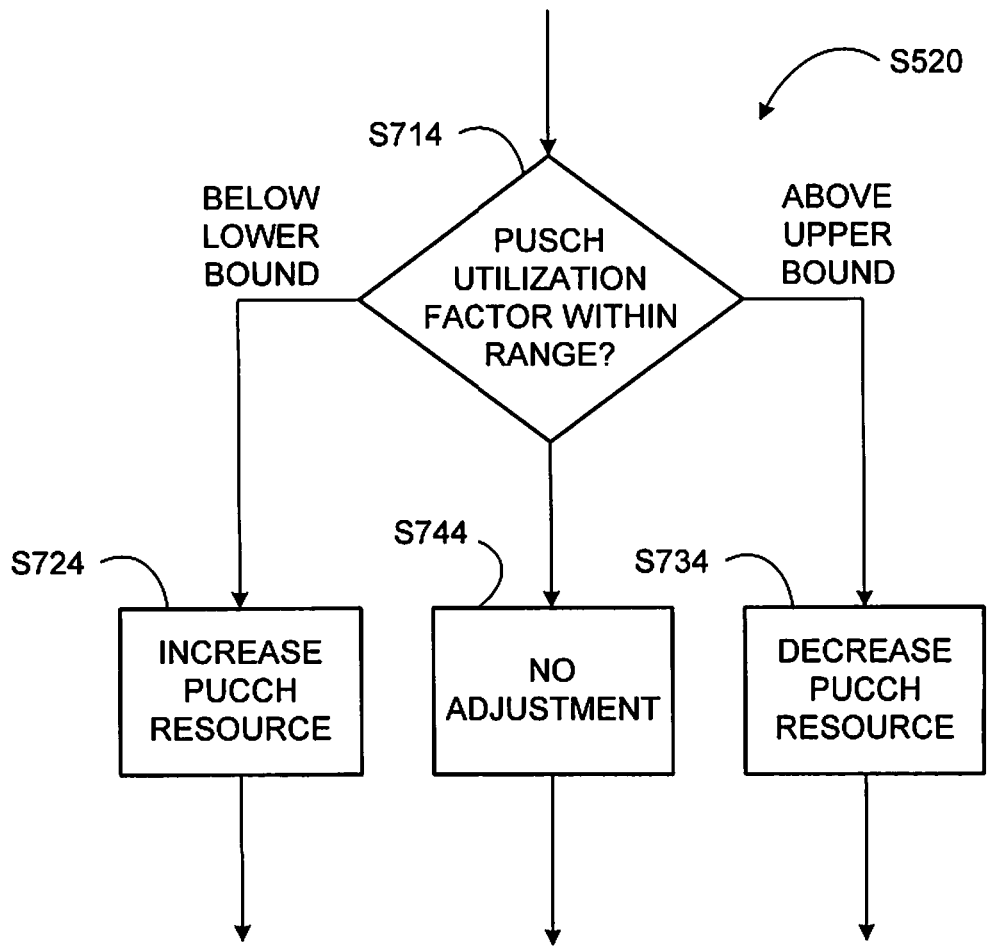

Then as illustrated in FIG. 7C, the PUCCH adjusting unit 330 determines and whether the PUCCH region should be adjusted (step S520) based on the PUSCH utilization factor. The PUCCH adjusting unit 330 compares the PUSCH utilization factor to a target PUSCH range (step S714). In this instance, the PUCCH adjusting unit 330 determines that the PUCCH region should be increased when the PUSCH utilization factor is below a lower bound of the target PUSCH range (step S724) and determines that the PUCCH region should be decreased when the PUSCH utilization factor is above an upper bound of the target PUSCH range (step S734). No adjustment is necessary when the PUSCH utilization factor is within the target range (step S744).

The logic behind incorporating the PUSCH utilization factor, and for incorporating the PUSCH utilization in general, is as follows. If the PUSCH is sparsely utilized, i.e., a low PUSCH utilization factor, then an increased PUCCH region does not degrade performance noticeably. This means that the cost of a larger PUCCH region is relatively small. On the other hand, if the PUSCH is highly utilized, i.e., a high PUSCH utilization factor, the uplink throughput can be negatively affected by an increase of the PUCCH region.

The methods described above evaluate the performance of the cell and adjust the PUCCH region based on the evaluation. According to one or more embodiments, the evaluations performed in one time period are used to adjust the PUCCH region in another time period.

The evaluations compare the cell utilization factors to target parameters such as the target PUCCH range, the target connection range, and the target PUSCH range. Just as the PUCCH region adjustment is applied to a future time period, the target parameters can also be adjusted for use in the future time period as well. This allows the target parameters to automatically adapt to the adjustments to the PUCCH region over time as well.

In FIG. 5, processing unit 310 determines whether or not any of the target parameters should be adjusted in step S560 and adjusts the target parameters step S570 when it so determines. In one embodiment, the processing unit 310 applies the adjustments to the target parameters to a future time period. In another embodiment, the utilization determining unit 320 updates the operation profile with information related to the adjusted target parameters. In any particular time period, the processing unit 310 can appropriately configure the PUCCH region including the target parameters used by the utilization determining unit 320 to make the appropriate comparisons.

Figure 8:
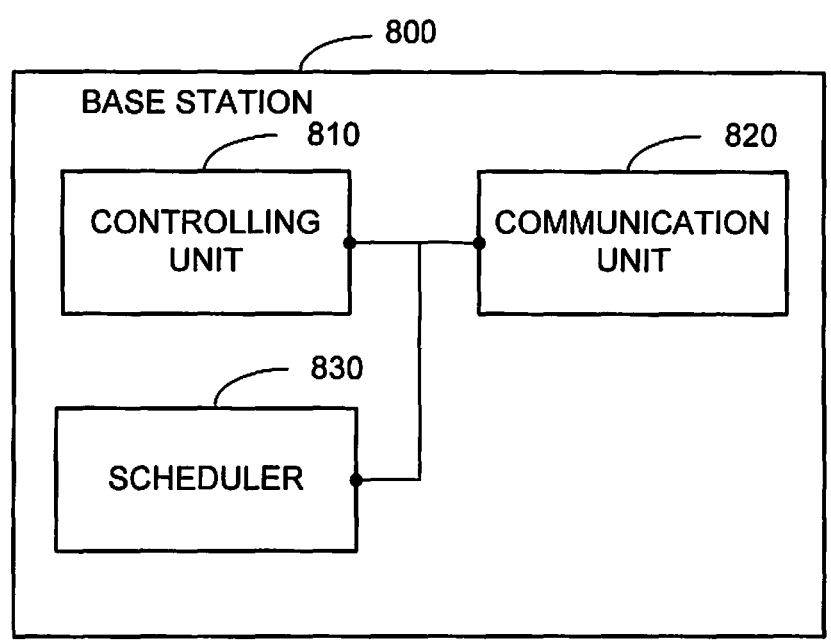
FIG. 8 illustrates an example embodiment of a base station.

FIG. 8 illustrates an embodiment of a base station 800. The base station, e.g., an eNodeB, includes a controlling unit 810, a communication unit 820, and a scheduler 830. In this embodiment, the controlling unit 810 is arranged to coordinate and control the operations of the other units of the base station 800 to provide services to the wireless terminals. The communication unit 820 is arranged to communicate with the wireless terminals including receiving uplink data and control reports via PUSCH and PUCCH resources. The scheduler 830 is arranged to provide scheduling services to the wireless terminals in the network including scheduling the PUCCH of a cell. In one aspect, the scheduler 830 is arranged to perform the same functions as the scheduler 300 illustrated in FIG. 3.

As one of many advantages, the disclosed technology can be used to avoid manual tuning of PUCCH region for individual cells. Also, a more regular adaptation of the PUCCH region to changes in the traffic characteristics is made possible. As a result, the PUCCH resource may be efficiently utilized, which lead to higher capacity in the network being secured.

Although the description above contains many specificities, these should not be construed as limiting the scope of the invention but as merely providing illustrations of some of the preferred embodiments. Therefore, it will be appreciated that the scope of the invention fully encompasses other embodiments, and the scope of the invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method to schedule a physical uplink control channel (PUCCH) of a cell in a wireless network for one or more wireless terminals, comprising:
   determining, over a time period, a shared uplink resource utilization including any one or more of a PUCCH utilization factor for a semi-static uplink control information (UCI) component of a semi-static PUCCH region, a connection factor of the cell, and a physical uplink shared channel (PUSCH) utilization factor of the cell;
   determining whether the semi-static PUCCH region should be adjusted based on the determined shared uplink resource utilization; and
   adjusting the semi-static PUCCH region when it is determined that the semi-static PUCCH region should be adjusted;
   wherein determining the PUCCH utilization factor for the semi-static UCI component comprises:
      determining a UCI component ratio of the semi-static UCI component for each of a plurality of uplink subframes over the time period; and
      determining the PUCCH utilization factor based on a distribution of the UCI component ratios over the time period, wherein the UCI component ratio is a ratio of an amount of semi-static PUCCH resources allocated for the semi-static UCI component relative to an entire amount of the semi-static PUCCH resources available in one uplink subframe.

2. The method of claim 1, wherein the time period is one of one or more specified time periods, and at least one of the specified time periods repeats in a pattern.

3. The method of claim 1 wherein the adjusted semi-static PUCCH region is applied to a future time period.

4. The method of claim 1, wherein in the step of adjusting the semi-static PUCCH region, an operation profile of the cell is updated with information related to an adjustment to the semi-static PUCCH region, the cell's operation profile being used to initially set a configuration of the semi-static PUCCH region of the cell for the time period.

5. The method of claim 1, wherein the semi-static UCI components include a channel quality indication, a scheduling request, a precoding matrix indicator, a rank indication, and a semi-static ACK/NACK.

6. The method of claim 1, wherein the PUCCH utilization factor is determined to be an average, a median, a sliding average, a mode, or a range of the distribution of the UCI component ratios.

7. The method of claim 1, wherein in the plurality of the uplink subframes is a subset, less than all, of the uplink subframes of the time period.

8. The method of claim 1, wherein the step of determining whether the semi-static PUCCH region should be adjusted comprises:
   determining that the semi-static PUCCH region should be increased when the PUCCH utilization factor is above an upper bound of a target PUCCH range for the semi-static UCI component; and
   determining that the semi-static PUCCH region should be decreased when the PUCCH utilization factor is below a lower bound of the target PUCCH range for the semi-static UCI component.

9. The method of claim 8, wherein each semi-static UCI component has a corresponding target PUCCH range that is valid for the time period.

10. The method of claim 8, wherein target parameters include the target PUCCH range, the target connection range, and the target PUSCH range, the method further comprising:
    determining that one or more target parameters should be adjusted; and
    adjusting the one or more target parameters when it is determined that the one or more target parameters should be adjusted, wherein the step of determining that the one or more target parameters should be adjusted comprises any one or more of:
    determining that the target PUCCH range should be adjusted when the PUCCH utilization factor is not within the target PUCCH range, determining that the target connection range should be adjusted when the connection factor is not within the target connection range, and determining that the target PUSCH range should be adjusted when the PUSCH utilization factor is not within the target PUSCH range.

11. The method of claim 10, wherein the adjusted one or more target parameters are applied to a future time period.

12. A scheduler of a cell in a wireless network to provide scheduling services to one or more wireless terminals in the network including scheduling a PUCCH of the cell, comprising:
    a utilization determining processor configured to determine, over a time period, a shared uplink resource utilization including any one or more of a PUCCH utilization factor for a semi-static UCI component of a semi-static PUCCH region, a connection factor of the cell, and a PUSCH utilization factor of the cell; and
    a PUCCH adjusting processor configured to determine whether the semi-static PUCCH region should be adjusted based on the determined shared uplink resource utilization, and to adjust the semi-static PUCCH region when it so determines;
    the utilization determining processor further configured to:
    determine a UCI component ratio of the semi-static UCI component for each of a plurality of uplink subframes over the time period; and
    determine the PUCCH utilization factor based on a distribution of the UCI component ratios over the time period, wherein the UCI component ratio is a ratio of an amount of semi-static PUCCH resources allocated for the semi-static UCI component relative to an entire amount of the semi-static PUCCH resources available in one uplink subframe.

13. The scheduler of claim 12, wherein the time period is one of one or more specified time periods in which at least one of the specified time periods repeats in a pattern.

14. The scheduler of claim 12, further comprising a processor configured to:
    apply the adjusted semi-static PUCCH region to a future time period;
    set an initial configuration of the semi-static PUCCH region of the cell for the time period based on a cell's operation profile; and
    update the operation profile of the cell with information related to an adjustment to the semi-static PUCCH region.

15. The scheduler of claim 12, wherein the utilization determining to determine the PUCCH utilization factor as an average, a median, a sliding average, a mode, or a range of the distribution of the UCI component ratios.

16. The scheduler of claim 12, wherein in the plurality of the uplink subframes is a subset, less than all, of the uplink subframes of the time period.

17. The scheduler of claim 12, wherein the PUCCH adjusting processor is configured to determine that the semi-static PUCCH region should be increased or decreased, respectively, when the PUCCH utilization factor is above an upper bound or below a lower bound of a target PUCCH range for the semi-static UCI component, and wherein each semi-static UCI component has a corresponding target PUCCH range that is valid for the time period.

18. The scheduler of claim 17, wherein target parameters include the target PUCCH range, the target connection range, and the target PUSCH range, and wherein the processing unit is arranged to determine whether one or more target parameters should be adjusted and to adjust the one or more target parameters when it so determines, apply the adjusted one or more target parameters to the future time period, and update the operation profile of the cell within a storage unit with information related to the adjusted one or more target parameters.

19. A base station in a wireless network to provide scheduling services to one or more wireless terminals in the network including scheduling a PUCCH of a cell corresponding to a service coverage area provided by the base station, the base station comprising:
    a control processor configured to coordinate and control operations of the base station to provide services to the wireless terminals;
    an interface configured to communicate with the wireless terminals including receiving uplink data and control reports via PUSCH and PUCCH resources; and
    a scheduling processor configured to provide scheduling services of the cell to the wireless terminals in the network, wherein the scheduling processor is configured to:
    determine, over a time period, a shared uplink resource utilization including any one or more of a PUCCH utilization factor for a semi-static UCI component of a semi-static region of the PUCCH, a connection factor of the cell, and a PUSCH utilization factor of the cell, determine whether the semi-static PUCCH region should be adjusted based on the determined shared uplink resource utilization, and adjust the semi-static PUCCH region when it determines that the semi-static PUCCH region should be adjusted;
    wherein the scheduling processor configured to determine the PUCCH utilization factor for the semi-static UCI component is configured to determine a UCI component ratio of the semi-static UCI component for each of a plurality of uplink subframes over the time period, and determine the PUCCH utilization factor based on a distribution of the UCI component ratios over the time period, wherein the UCI component ratio is a ratio of an amount of semi-static PUCCH resources allocated for the semi-static UCI component relative to an entire amount of the semi-static PUCCH resources available in one uplink subframe, wherein in the plurality of the uplink subframes is a subset, less than all, of the uplink subframes of the time period, and wherein the PUCCH utilization factor is determined as an average, a median, a sliding average, a mode, or a range of the distribution of the UCI component ratios.

20. The base station of claim 19, wherein the scheduling processor is configured to apply the adjusted semi-static PUCCH region to a future time period, initially set a configuration of the semi-static PUCCH region of the cell for the time period based on a cell's operation profile, and update the operation profile of the cell with information related to an adjustment to the semi-static PUCCH region.

21. The base station of claim 19, wherein the scheduling processor is configured to determine that the semi-static PUCCH region should be increased or decreased, respectively, when the PUCCH utilization factor is above an upper bound or below a lower bound of a target PUCCH range for the semi-static UCI component, and wherein each semi-static UCI component has a corresponding target PUCCH range that is valid for the time period.

\* \* \* \* \*